United States Patent [19]

Kurz

[11] Patent Number: 4,958,401

[45] Date of Patent: Sep. 25, 1990

[54] UNIVERSAL TOOL FOR SOLDERING AND DE-SOLDERING APPARATUS

[75] Inventor: Jurgen Kurz, Weikersheim, Fed. Rep. of Germany

[73] Assignee: Cooper Industries, Inc., Houston, Tex.

[21] Appl. No.: 220,760

[22] Filed: Aug. 25, 1988

[51] Int. Cl.⁵ .................................................. B08B 9/02
[52] U.S. Cl. ................................ 15/104.16; 15/104.05; 15/105; 15/236.05; 206/37
[58] Field of Search ................. 15/104.05, 104.1 R, 15/104.16, 105, 236.07, 236.05; 206/37

[56] References Cited

U.S. PATENT DOCUMENTS 2,473,758  6/1949  Maitlen .......................... 15/104.05
2,503,380  4/1950  Derby ............................ 15/104.05

Primary Examiner—Edward L. Roberts

Attorney, Agent, or Firm—David A. Rose; Gregory L. Maag; Ned L. Conley

[57] ABSTRACT

A universal tool for maintenance and handling of soldering and de-soldering equipment incorporates a holder for cleaning needles that is inserted into a handle. The holder consists of a number of segments, each of which holds one cleaning needle at any time, that are connected to each other by means of an axis of rotation. The segment that contains the desired cleaning needle at any one time is rotated 180° in relation to the other segments from the holder that has been removed from the handle, at which time the holder is inserted into the handle with the unused cleaning needles facing into the handle. The handle has hexagonal openings at both ends, which are used to screw or unscrew nozzles, suction nozzles, and clamping sleeves. The holder can be inserted into one of these hexagonal openings. The holder can also be fitted with a cap that has a slot through which a selected cleaning needle may pass.

16 Claims, 1 Drawing Sheet

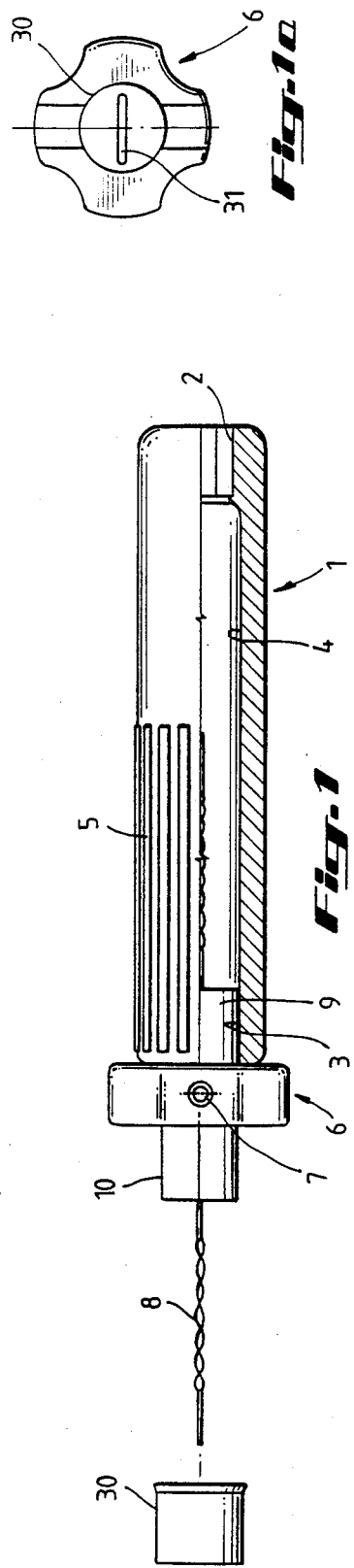
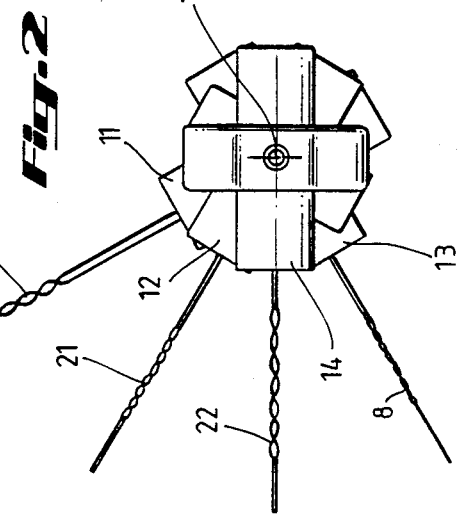
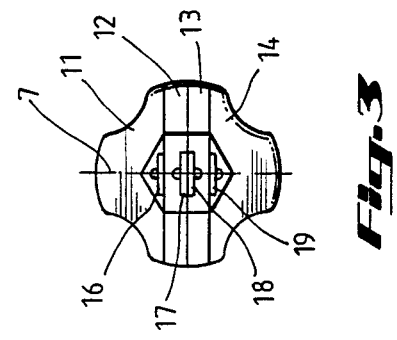
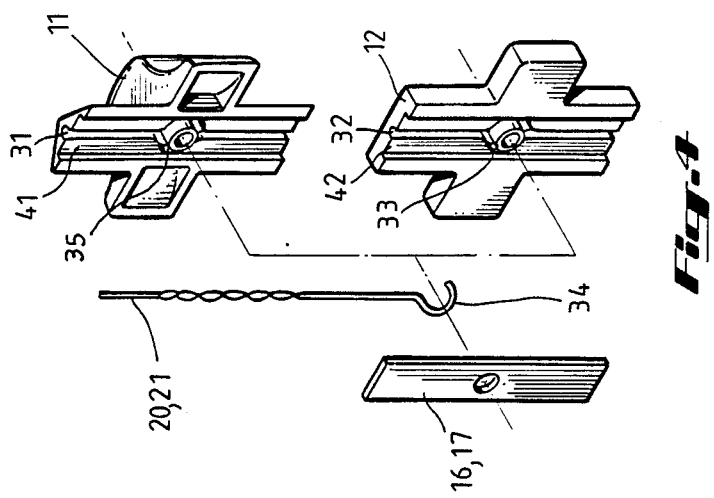

UNIVERSAL TOOL FOR SOLDERING AND DE-SOLDERING APPARATUS

BACKGROUND OF THE INVENTION

The present invention concerns a universal tool for maintenance and handling of soldering and de-soldering equipment.

It is very often required in soldering and de-soldering operations to change the suction nozzle used with de-soldering equipment or otherwise to clean the suction nozzle before de-soldering. Similarily, it is often required to clean the soldering head or the suction channels. Until now, the changing of the suction nozzle for de-soldering was achieved with several tools or it was done by the user with pliers or the like. Since the parts to be changed may be very hot, the danger of serious burns exists for the user; furthermore, the suction nozzles for de-soldering in the soldering head have several diameters. Each different diameter requires a different size cleaning tool.

There is therefore a need to provide a universal tool that allows for the maintenance of soldering and de-soldering equipment as well as the changing and the cleaning of nozzles for de-soldering without the danger of an injury to the user.

SUMMARY OF THE INVENTION

With the universal tool of the present invention, all tools necessary for the maintenance and handling of soldering and de-soldering equipment are combined. The tool has a handle with socket-wrench-like openings at its ends. These socket-wrench-like openings are suitable for both changing soldering tips and the screw caps which hold them in place as well as for changing the de-soldering nozzles.

In the preferred embodiment each of the socket-wrench-like openings is of a different size; however, one of these socket-wrench-like openings may be used for the installation of a cleaning needle holder. The cleaning needle holder is subdivided into several segments, each of which carries one cleaning needle. The individual segments are rotatable, one with respect to another, and can be connected relative to each other in such a manner, that only one cleaning needle protrudes at any one time from one side of the holder. The remaining cleaning needles remain within a hollow section of the handle. Facilitating the mounting of the cleaning needle holder into the handle is the shape of the individual segments. When a cleaning needle is in position for use or when the cleaning needles are all in the handle the rotatable segments form a hexagon which engages the socket-wrench-like opening in one end of the handle. This hexagon shape is called an insertion piece herein.

When not in use or for transportation of the universal tool, all segments may be placed in a position, wherein all cleaning needles may be inserted into the handle. In that case, no cleaning needles protrude from the handle. Thus, the unused cleaning needles are located in the handle and are protected from contamination or from bending.

It is preferred that the individual cleaning needles emanating from each segment have different diameters as this permits them to match the objects to be cleaned. These cleaning needles are flexible and therefore suitable for use in bent or curved suction channels.

The individual cleaning needles may be arranged interchangeably in the segments by the user, who may then equip the holder with respective cleaning needles of his choice.

Furthermore, it is also possible to fit the end of the holder at the opposite side from the insertion piece with a cap, which affords additional heat protection to the user.

The hollow handle makes it also possible to unscrew, clamping sleeves that hold the soldering tips in place, without any danger of burns, as the hot part of the clamping sleeve is in the inside of the heat-resistant plastic handle.

BRIEF DESCRIPTION OF THE FIGURES

Examples of the present invention are explained in more detail with the help of the drawings.

FIG. 1 is an elevational view in partial section of the universal tool with the cleaning needle holder inserted;

FIG. 1a is an elevational view looking toward the handle in accordance with FIG. 1, with the cap fitted onto the holder for the cleaning needles;

FIG. 2 is an elevational view of the holder for cleaning needles illustrating the movement of the individual segments which carry the cleaning needles;

FIG. 3 is a top view of the holder, as seen from the left in FIG. 1; and

FIG. 4 is an elevational view of one half of the holder in accordance with FIG. 2 and FIG. 3.

DESCRIPTION OF THE EMBODIMENTS

The universal tool of the present invention shown in the drawings has a long hollow handle 1, that has non-circular socket-type openings 2 and 3 at its ends. In the preferred embodiment these are formed in the shape of a hexagon.

The handle 1 has a hollow portion 4 with an inside diameter that is to or smaller than the average diameter of socket-type openings 2 and 3.

Furthermore, handle 1 has a knurled surface 5 on a part of its circumferential surface for ease of handling.

Insertion piece 9 of holder 6 for cleaning needles can be inserted into one of the openings 3. In the preferred embodiment this insertion piece 9 has a hexagonal shape that corresponds to the shape of opening 3 which permits holder 6 to be positively coupled to handle 1 after the insertion of insertion piece 9 into opening 3.

As may be seen in FIGS. 2, 3 and 4, holder 6 consists of several segments 11, 12, 13, 14. Four segments 11, 12, 13, 14 are shown in the preferred embodiment. Each segment may be rotated relative to the other segments. The segments come form hexagonal insertion piece 9. Each segment 11, 12, 13, 14 is basically of a cross-like shape. Axis of rotation 7 runs through the center point of the cross. Besides insertion piece 9, the cross-like shape together with the aligned segments, forms another insertion piece 10 opposite insertion piece 9, which is outside of handle 1, if insertion piece 9 is inserted into the handle as shown in FIG. 1.

During the use of the universal tool of the present invention, this additional insertion piece may be covered by a cap 30 made of metal or some other heat-resistant material, as shown in FIG. 1 and FIG. 1a. Cap 30 has a slot 31 at the bottom, through which the respective cleaning needle 8 in use may pass.

In the example shown and as seen especially in FIGS. 3 and 4, cleaning needle holder 6 consists of two intermediate segments 12 and 13 and two exterior segments 11 and 14. Intermediate segments 12 and 13 are made in the form of a plate and have two surfaces that are parallel to each other. In one of these main surfaces, as shown by reference to segment 12 in FIG. 4, a first recess 42 is formed. At the bottom of first recess 42 another groove 32 is formed. Groove 32 is used to accept one end of a cleaning needle 20 or 21. Recess 42 is then covered with a cover plate 17 that holds needle 21 firmly in place in groove 32 and connects it solidly to segment 12. As can be further seen in FIG. 4, segment 12 has an annular slot 33 around the axis of rotation 7 into which a bent end 34 of the cleaning needle 21 fits.

The size of groove 32, into which the cleaning needles fit, may differ from segment to segment, thus permitting adjustment to various diameters of cleaning needles.

External segments 11, and 14 have a longitudinal section, whose cross section is of a triangular shape. Segments 11, 12, 13 and 14, form the hexagonal shaped insertion pieces 9 and 10 which fit into opening 3. The main surface of externally located segments 11, and 14 opposite the point of the triangularly shaped cross section of the longitudinal section, is fitted with a first recess 41 to accept a cover plate 16 and with a groove 31 to accept the cleaning needle. These segments also have an annular slot 35 around the axis of rotation which accepts the bent end 34 of cleaning needles.

Axis of rotation 7 may be made to include a tubular rivet, which extends through all segments 11, 12, 13, 14 and connects them together. The segments may also be placed in any desired position side by side and, without the physical presence of the axis of rotation, inserted into handle 1 with insertion piece 9 formed by being located together. Thus, the individual segments 11, 12, 13, 14 are force-locked to each other. This force-locked connection may even be reinforced by cap 30 shown in FIG. 1.

It can be seen in FIG. 1 that, depending on the position of rotation, either only one cleaning needle 8 protrudes from handle 1 while all the other cleaning needles including their segments are rotated in such a way that they lie inside handle 1, or that all needles are rotated into the same direction and protected while being arranged in handle 1.

Socket wrench openings 2 and 3 may be matched to the soldering equipment in use thus permitting their use for both changing nozzles and suction nozzles. The cleaning needles may also be matched to the parts to be cleaned, for example, the suction nozzles or suction tubes.

There is thereby provided by the universal tool of the present invention a device that facilitates the maintenance of soldering and de-soldering equipment as well as the changing and the cleaning of nozzles and suction nozzles for de-soldering without the danger of an injury to the user.

The foregoing embodiment is intended to illustrate the present invention and not to limit it in spirit or scope.

I claim:

1. A universal tool for soldering and de-soldering equipment, comprising:
   an elongated hollow handle having axially directed socket openings on either end;
   a plurality of cleaning needles; and
   a holder for removably mounting said needles to said handle, said holder having:
   a plurality of segments constructed and arranged to mount said cleaning needles, wherein each of said segments is adapted for mounting one of said cleaning needles and wherein said segments are rotatable one with respect to the other; and
   an insertion piece formable by the rotation of said segments for removable mounting of said holder in one of said axially directed socket openings in said elongated hollow handle.

2. The universal tool as defined in claim 1 wherein said plurality of segments are rotated relative to an axis of rotation which is perpendicular to the longitudinal axis of said elongated hollow handle.

3. The universal tool as defined in claim 1 wherein said plurality of segments are formed substantially in the shape of a cross whose arm sections have a groove constructed and arranged to fit a cleaning needle, said cross like shape further being constructed and arranged such that said axis of rotation passes through the central point of the cross and the parts of the arm sections when aligned form said insertion piece.

4. The universal tool as defined in claim 3 further including a slotted cap adapted for passing cleaning needles mounted in said holder when said cap is placed over said holder.

5. The universal tool as defined in claim 4 wherein said holder includes an annular slot in the area of said axis of rotation adapted for mounting cleaning needles.

6. The universal tool as defined in claim 5 wherein said elongated hollow handle has a knurled surface.

7. The universal tool as defined in claim 6 further including a cover plate constructed and arranged to retain a cleaning needle within said groove in said holder.

8. The universal tool as defined in claim 7 wherein said cover plate is fitted within a recess within said holder.

9. The universal tool as defined in claim 8 wherein said holder segments, when aligned, form a hexagonal shape.

10. A tool for use with soldering and de-soldering equipment, comprising:
    an elongate hollow handle having an axially directed socket opening on at least one end thereof;
    a cleaning needle holder having an insertion piece for insertion into said socket opening of said handle; and
    a plurality of cleaning needles retained by said holder;
    said cleaning needle holder comprising a plurality of holder segments formed substantially in the shape of a cross, each of said segments adapted for mounting one of said cleaning needles, said segments being rotatable one with respect to the other about an axis of rotation that is substantially perpendicular to the longitudinal axis of said handle.

11. The tool of claim 10 wherein said axis of rotation of said holder segments passes through the central point of the cross-like segments and wherein said segments include arm sections forming said insertion piece of said holder when said arms of said segments are aligned.

12. The tool of claim 11 wherein said insertion piece is hexagonal in cross section.

13. The tool of claim 11 wherein said handle includes a socket opening on each end thereof.

14. The tool of claim 11 wherein said arm sections include a groove formed therein for retaining one of said plurality of cleaning needles therein.

15. The tool of claim 14 wherein said holder segments further include an annular slot formed about said axis of rotation for mounting said cleaning needles.

16. The tool of claim 14 further comprising:
    recesses formed in said arm sections of said holder segments, said grooves being formed in said recesses; and
    cover plates disposed in said recesses for retaining said cleaning needles within said grooves.

* * * * *